(12) United States Patent
Prescott

(10) Patent No.: US 9,701,554 B2
(45) Date of Patent: Jul. 11, 2017

(54) AERATION CONTROL VALVE SYSTEM FOR WATER TREATMENT SYSTEM AND METHODS FOR USING SAME

(71) Applicant: R.E. Prescott Co., Inc, Exeter, NH (US)

(72) Inventor: Russell E. Prescott, Kingston, NH (US)

(73) Assignee: R.E. Prescott Co., Inc., Exeter, NH (US)

( * ) Notice: Subject to any disclaimer, the term of this patent is extended or adjusted under 35 U.S.C. 154(b) by 0 days.

(21) Appl. No.: 15/064,038

(22) Filed: Mar. 8, 2016

(65) Prior Publication Data

US 2016/0185631 A1    Jun. 30, 2016

Related U.S. Application Data

(62) Division of application No. 14/051,176, filed on Oct. 10, 2013, now Pat. No. 9,290,397.

(51) Int. Cl.
*C02F 1/68* (2006.01)
*C02F 1/74* (2006.01)

(52) U.S. Cl.
CPC ............ *C02F 1/68* (2013.01); *C02F 1/74* (2013.01); *C02F 2303/16* (2013.01)

(58) Field of Classification Search
None
See application file for complete search history.

(56) References Cited

U.S. PATENT DOCUMENTS

| | | | |
|---|---|---|---|
| 3,151,064 | A | 9/1964 | Lathrop |
| 4,105,721 | A | 8/1978 | Schliebe |
| 5,096,596 | A | 3/1992 | Hellenbrand et al. |
| 5,628,899 | A | 5/1997 | Vaughan |
| 5,919,373 | A | 7/1999 | Naaktgeboren |
| 6,402,944 | B1 | 6/2002 | Vaughan |
| 7,300,569 | B2 | 11/2007 | Petty |
| 7,488,424 | B2 | 2/2009 | Gruett et al. |
| 7,563,361 | B2 | 7/2009 | Gruett et al. |
| 7,638,063 | B1 | 12/2009 | Maas et al. |
| 7,722,760 | B2 | 5/2010 | Griesbach |

(Continued)

OTHER PUBLICATIONS

PCT International Search Report and Written Opinion mailed Oct. 30, 2014, received in corresponding PCT Application No. PCT/US14/50564, 8 pgs.

*Primary Examiner* — Chester Barry
(74) *Attorney, Agent, or Firm* — Grossman Tucker Perreault & Pfleger, PLLC

(57) ABSTRACT

An aeration control valve system may be used with a water treatment system to control aeration and flow of water in accordance with various operating cycles. The aeration control valve system causes air to be pumped or drawn into the water treatment system during an air charge cycle to provide an air charge for aerating the water to facilitate water treatment. The aeration control valve system releases the air during an air release cycle without requiring a backwash cycle. In one embodiment, the aeration control valve system includes a control valve unit configured for connection to a brine tank but instead fluidly coupled to an air intake inlet and an air release outlet for supplying and releasing air, respectively, when the valve cycle actuator is in the brine position and brine tank fill position, respectively.

10 Claims, 9 Drawing Sheets

(56) References Cited

U.S. PATENT DOCUMENTS

2003/0164337 A1\* 9/2003 Maas ................ C02F 1/008
                                                  210/721
2012/0097618 A1   4/2012 Prescott
2013/0075313 A1   3/2013 Handy \* cited by examiner

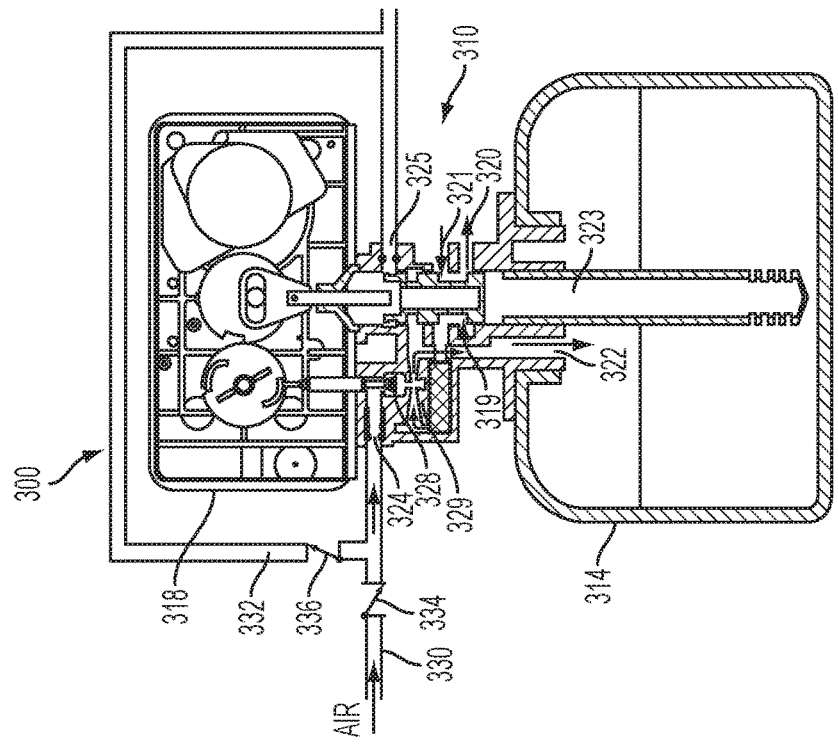
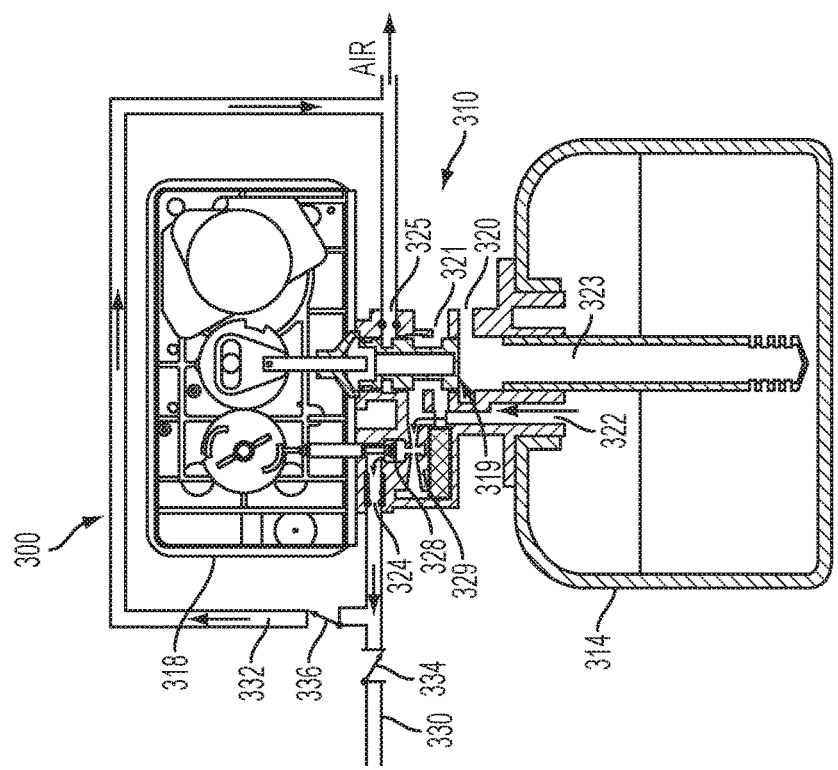

AERATION CONTROL VALVE SYSTEM FOR WATER TREATMENT SYSTEM AND METHODS FOR USING SAME

CROSS-REFERENCE TO RELATED APPLICATIONS

The present application is a divisional of U.S. patent application Ser. No. 14/051,176 filed Oct. 10, 2013, now U.S. Pat. No. 9,290,397.

TECHNICAL FIELD

The present invention relates to water treatment systems and more particularly, to an aeration control valve system for controlling water flow through and aeration in a water treatment system.

BACKGROUND INFORMATION

Water treatment systems are commonly used in water supply systems. In a residential water supply system, for example, water softeners, acid neutralizers, iron/manganese removal systems, arsenic removal systems, and aeration systems may be used to filter or treat the water being supplied from a water source (e.g., from a well or city water supply). To facilitate the removal of contaminants, such as iron, manganese, and sulfur, some water treatment systems aerate the water to provide oxidation prior to the filtering. In such systems, a head of air may be maintained at the top of a water treatment tank such that the water provided to the tank passes through the head of air before passing through filter media.

Some existing water treatment systems include a control valve (e.g., connected to the top of the tank) to control the water passing in to and out of the system according to water treatment operating cycles. To provide the head of air in an existing water treatment system that uses aeration, the control valve may perform an air charge cycle by directing water through a venturi coupled to an air inlet such that the venturi draws air into the top of the filter tank. During a service cycle, the control valve directs the water to flow through the trapped air in the tank, through filter media in the tank, and then to a service water system (e.g., a residential water system). The old compressed air in the tank may be released or discharged when the control cycle opens a drain line during a backwash cycle.

The use of these existing water treatment systems providing aeration presents several drawbacks. One such drawback is the noise and rattling of the drain line when the compressed air charge is released suddenly during the backwash cycle. If the drain line is not properly secured, this may also cause unwanted splashing, breaks and/or flooding. The rapid air escape may also cause the filter media to jump vertically inside the filter tank, causing it to be lost through the drain line and possibly causing plugging of the drain and flooding. To avoid this, existing systems often use less filter media and approximately 25% of the filter bed depth may be lost, requiring more frequent air regenerations, wasted water and wasted electricity. Using a larger tank results in more water going to drain during an air charge cycle and an increased cost of the filter media.

A further drawback of the existing systems providing aeration is the need for a backwash cycle before an air charge cycle to provide a new charge of air. These existing systems may not be recharged with air while remaining in service and the additional backwash cycles waste water.

BRIEF DESCRIPTION OF THE DRAWINGS

These and other features and advantages will be better understood by reading the following detailed description, taken together with the drawings wherein:

FIGS. 3A and 3B are cross-sectional views of one embodiment of an aeration control valve during an air release cycle and an air charge cycle, respectively.

DETAILED DESCRIPTION

An aeration control valve system, consistent with embodiments of the present invention, may be used with a water treatment system to control aeration and flow of water in accordance with various operating cycles. The aeration control valve system causes air to be pumped or drawn into the water treatment system during an air charge or draw cycle to provide an air charge for aerating the water to facilitate water treatment. The aeration control valve system releases the air during an air release cycle without requiring a backwash cycle. In one embodiment, the aeration control valve system includes a control valve unit configured for connection to a brine tank but instead fluidly coupled to an air intake inlet and an air release outlet for supplying and releasing air, respectively, when the valve actuator is in the brine position and brine tank fill position, respectively.

As used herein, "fluid connection" refers to a connection between elements that allows fluid to flow between the elements and "fluidly couple" refers to coupling elements in a manner that allows a fluid connection between the elements. The terms "couple" and "connection" are not limited to a direct mechanical connection and may include an indirect mechanical connection that is made through other components or structures.

Figure 1:
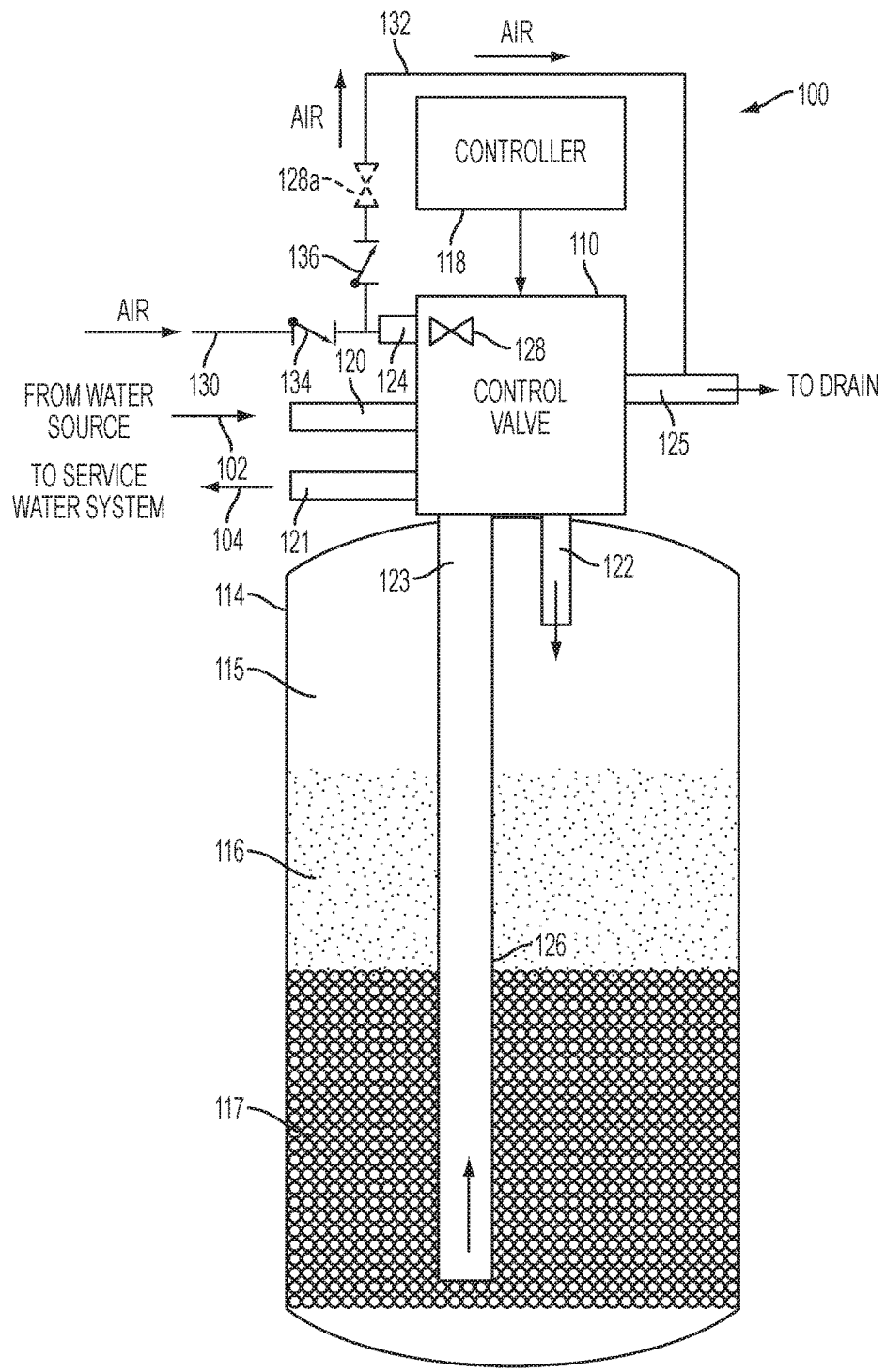
FIG. 1 is a schematic view of a water treatment system including an aeration control valve system, consistent with embodiments of the present invention.

Referring to FIG. 1, a water treatment system 100, consistent with an embodiment, includes an aeration control valve 110 fluidly coupled to a water treatment tank 114 and various inlets and outlets. The aeration control valve 110 controls the flow of air and water in to and out of the water treatment tank 114. The air may be pumped or drawn into the tank 114 during an air charge cycle and released or discharged during an air discharge cycle without requiring a backwash. The water treatment tank 114 may contain an air charge 115, aerated water 116 to be treated, and filter media 117 for filtering the aerated water 116. To provide water treatment, the water treatment system 100 directs water from a supply line 102 through the water treatment tank 114 to a delivery line 104. The supply line 102 may supply water from a water source such as a well or city water supply. The delivery line 104 may provide water to a service water system in a building, such as a residential home. The water treatment system 100 may be coupled, for example, to a residential water supply system at the point of entry. The water treatment system 100 may also be configured for use in a commercial water supply system.

The water treatment system 100 aerates the water 116 as it passes through the air charge 115 in the water treatment tank 114 and then filters the aerated water 116 as it passes through filter media 117. In one example, iron, manganese and hydrogen sulfide gas dissolved in the water 116 is oxidized when exposed to the air charge 115 and becomes a solid precipitate that can be trapped in the filter media 117. The filter media 117 includes any type of filter media capable of trapping the contaminants to be removed. The aeration control valve 110 may be used with various types and configurations of water treatment systems.

The control valve 110 may include a supply water inlet passage 120, a service water outlet passage 121, first and second tank passages 122, 123, an air passage 124, and a drain outlet passage 125. The supply water inlet passage 120 may be fluidly coupled to the supply line 102 and the service water outlet passage 121 may be fluidly coupled to the delivery line 104. The first and second tank passages 122, 123 are fluidly coupled to the water treatment tank 114 for passing water in to and out of the tank 114. In the illustrated embodiment, the second tank passage 123 is fluidly coupled to a conduit 126 that extends into the filter media 117 proximate the bottom region of the water treatment tank 114. The drain outlet passage 125 may be coupled to a drain for directing water from the tank 114 to the drain.

An air intake inlet 130 is fluidly coupled to the air passage 124 for supplying air into the tank 114, for example, using a pump to pump the air or a venturi to draw the air, as described in greater detail below. An air release outlet 132 is fluidly coupled to the air passage 124 for releasing air from the tank 114. In the illustrated embodiment, the air release outlet 132 is also fluidly coupled to the drain outlet passage 125 such that the air is released into the drain. An air intake check valve 134 is coupled to the air intake inlet 130 to allow air to be supplied to the air passage 124 without allowing released air to pass out of the air intake inlet 130. The air intake check valve 134 may be configured to open under vacuum or with an atmospheric air pump, as described below. An air release check valve 136 is coupled to the air release outlet 132 to allow air to be released from the air passage 124 without allowing the released air to pass back into the air passage 124. The air release check valve 136 may be configured with a high tension spring to assure a firm seal such that, when the air is pumped into the air passage 124, no air is pumped through the air release check valve 136 to the air release outlet 132 and drain passage 125. Thus, air release and air intake may be provided through a single connection to the air passage 124.

An air valve 128, 128a controls the supply and/or release of air to and/or from the tank 114. An internal air valve 128, for example, may be located within the control valve 110 and fluidly coupled to the air passage 124. Alternatively, an external air valve 128a may be located external to the control valve 110 and fluidly coupled to the air release outlet 132. When the external air valve 128a is used, the air release check valve 136 may not be necessary.

The control valve 110 may also include a valve cycle actuator (not shown) that provides fluid connections between the passages 120-125 based on different positions of the valve cycle actuator. The control valve 110 controls the flow of water and/or air between the passages 120-125 and in to and out of the water treatment tank 114, for example, according to the various water treatment cycles or operations. In one embodiment, for example, a control valve assembly may provide different positions (e.g., a service position, air release position, a backwash position, and an air draw or charge position) allowing water and/or air to flow according to different water treatment cycles.

As will be described in greater detail below, the aeration control valve 110 may be based on an existing control valve such as the Fleck 1500, Fleck 2510, Fleck 5600SXT, Fleck 5800SXT and Fleck ProFloSXT control valves available from Pentair, Inc. In one embodiment, an air pump (not shown in FIG. 1) coupled to the aeration control valve 110 may be an atmospheric air pump capable of providing air pressures in a range of about 0.1 to 25 psi. In another embodiment, the air pump coupled to the aeration control valve 110 may be a high pressure air pump capable of providing air pressures greater than about 25 psi. An aeration control valve system including a high pressure air pump may be capable of providing a service/air charge cycle in which the water treatment system 100 provides an air charge in the water treatment tank 114 while also treating the water.

The control valve 110 may include user controls on a side thereof to allow the user to control valve functionality such as when certain treatment cycles or operations occur (e.g., based on a time of day or number of days or number of gallons used). A controller 118 may also be coupled to the control valve 110 to control operation of the control valve 110 and initiation of the cycles of operation, for example, according to a programmed schedule. Other types of controls may also be provided.

Examples of water treatment systems include, but are not limited to, water softeners, acid neutralizers, iron/manganese removal systems, arsenic removal systems, other contaminant removal systems, and aeration systems. Water treatment systems may include tanks or other devices that store or allow water to pass through as part of a treatment process. The water treatment systems may also include redundant water treatment tanks (e.g., redundant arsenic removal systems) or may include different water treatment tanks (e.g., an acid neutralizer and a water softener). Water treatment systems may also include water heaters or other devices that alter the temperature or other conditions of the water.

FIGS. 2A-2F illustrate water and/or air flow through the aeration control valve 110 during different operating cycles of the water treatment system 100. Although certain operating cycles are illustrated and described herein, the water treatment system 100 and the aeration control valve 110 are not limited to these operating cycles and may be used with other operating cycles.

Figure 2A:
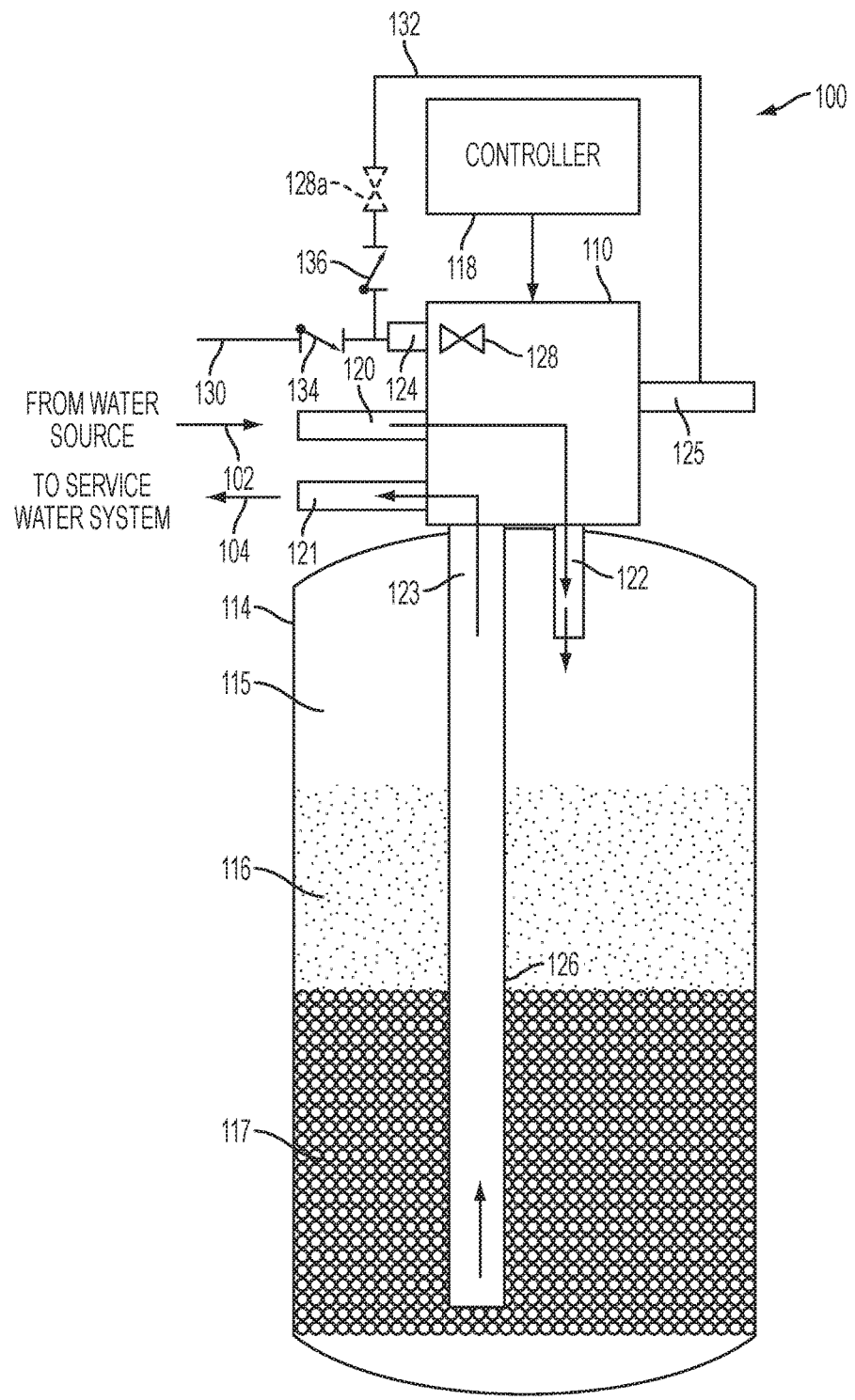
FIG. 2A is a schematic view of the water treatment system in FIG. 1 illustrating flow through the aeration control valve system during a service cycle.

FIG. 2A illustrates a service cycle during which the water treatment system 100 is "in service" treating water and directing the treated water to the service water system. During the service cycle in this embodiment, the aeration control valve 110 directs untreated water from the supply water inlet passage 120 to the first tank passage 122 and directs treated water from the second tank passage 123 to the service water outlet passage 121. The untreated water from the first tank passage 122 may be directed to the top region of the tank 114 such that the water passes through the charge of air 115. The treated water may be drawn from the bottom region of the tank (i.e., after passing through the filter media 117) through the conduit 126 coupled to the second tank passage 123. The aeration control valve 110 (e.g., the air valve 128) may also substantially prevent air 115 from escaping from the tank 114 during the service cycle, thereby maintaining the air charge for aeration during filtering.

Figure 2B:
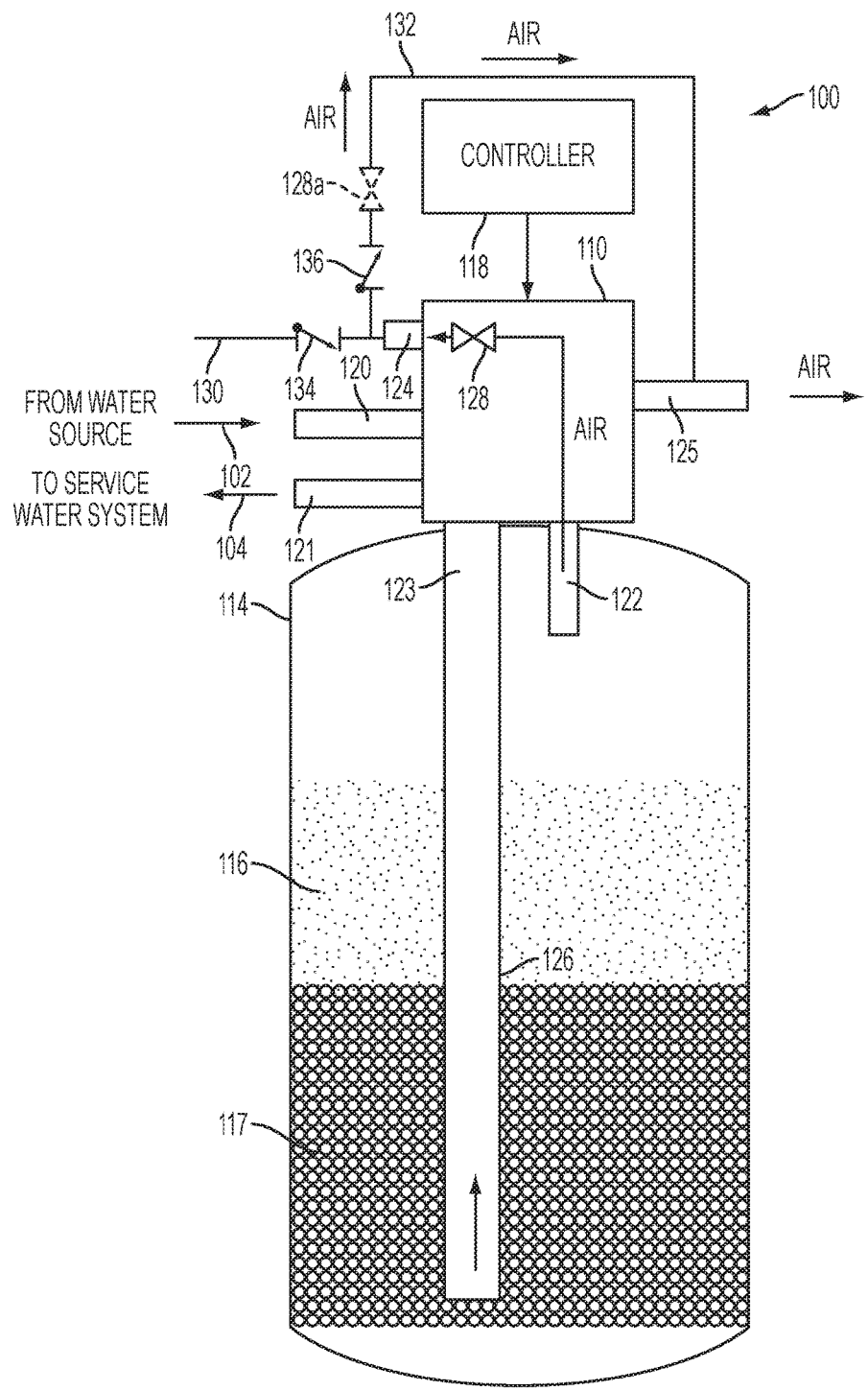
FIG. 2B is a schematic view of the water treatment system in FIG. 1 illustrating flow through the aeration control valve system during an air release cycle.

FIG. 2B illustrates an air release cycle during which the water treatment system 100 allows the release of air, for example, prior to an air charge cycle or prior to a backwash cycle. During the air release cycle in this embodiment, the aeration control valve 110 directs air 115 in the water treatment tank 114 through the air passage 124 and through the air release outlet 132 to the drain passage 125. In particular, the air valve 128, 128a is actuated to allow the air to be released into the air passage 124. The air may be released relatively slowly (e.g., at a rate of 0.5 CFM or less) to prevent a sudden depressurization. By performing an air release cycle prior to a backwash cycle, the release of air may be controlled to prevent the air charge from rushing out to the drain during backwash, thereby preventing noise, rattling, flooding, and loss of filter media. During the air release cycle, the aeration control valve 110 may also direct untreated water from the supply water inlet passage 120 to the first tank passage 122 and directs treated water from the second tank passage 123 to the service water outlet passage 121. Thus, the air release may occur while the water treatment system 100 is "in service" and treating water.

Figure 2C:
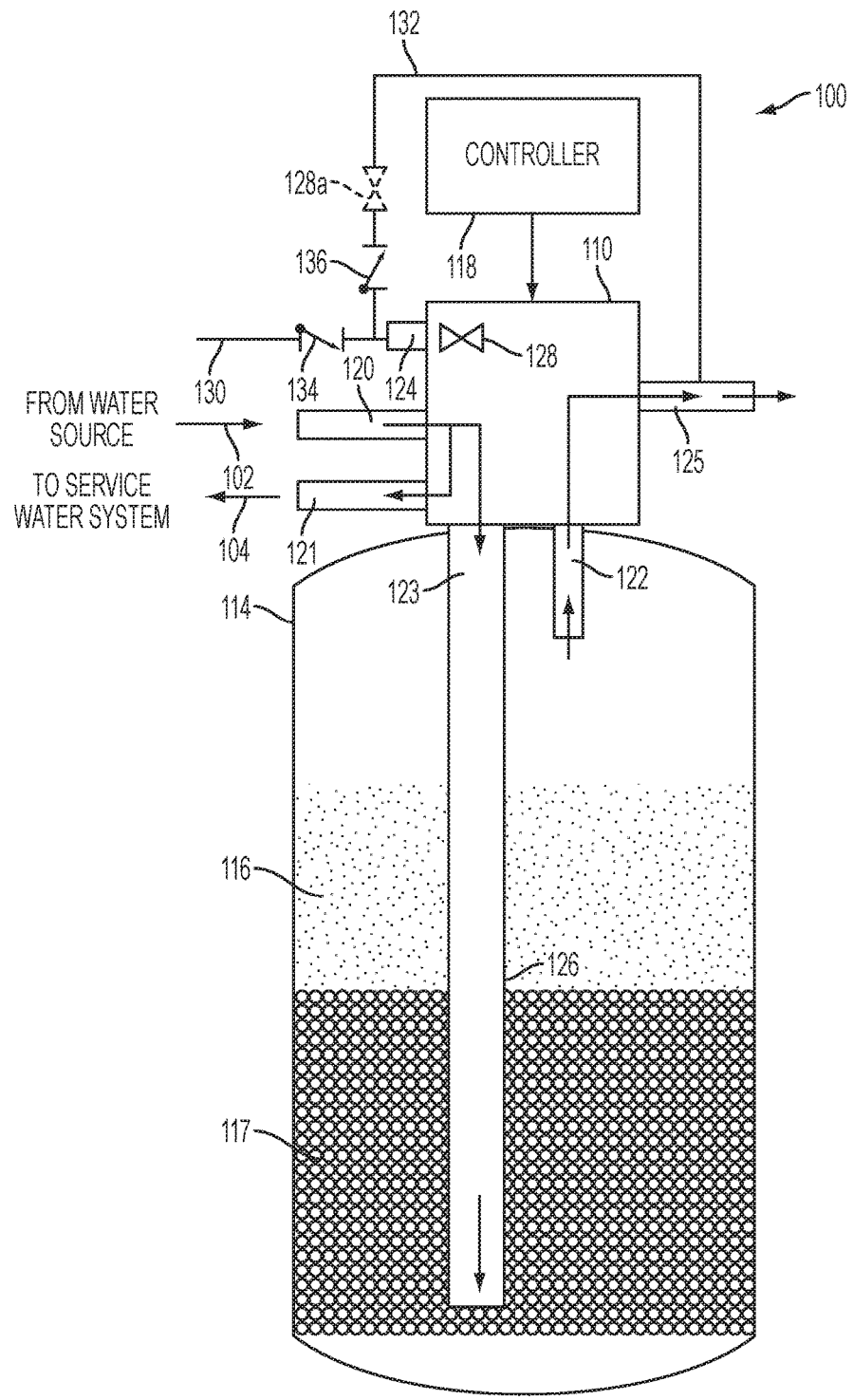
FIG. 2C is a schematic view of the water treatment system in FIG. 1 illustrating flow through the aeration control valve system during a backwash cycle.

FIG. 2C illustrates a backwash cycle during which the water treatment system 100 reverses the flow of water to clean or wash precipitates off the filter media 117. During the backwash cycle in this embodiment, the aeration control valve 110 directs untreated water from the supply water inlet passage 120 to the second tank passage 123 and directs the water in the tank 114 from the first tank passage 122 to the drain passage 125, thereby reversing the direction of flow through the tank 114. The water thus flows from the second tank passage 123, down the conduit 126, up through the filter media 117, and into the first tank passage 122. During the backwash cycle, the aeration control valve 110 may also direct a portion of the untreated water from the supply water inlet passage 120 to the service water outlet passage 121 such that water is supplied to the service water system during the backwash cycle.

Figure 2D:
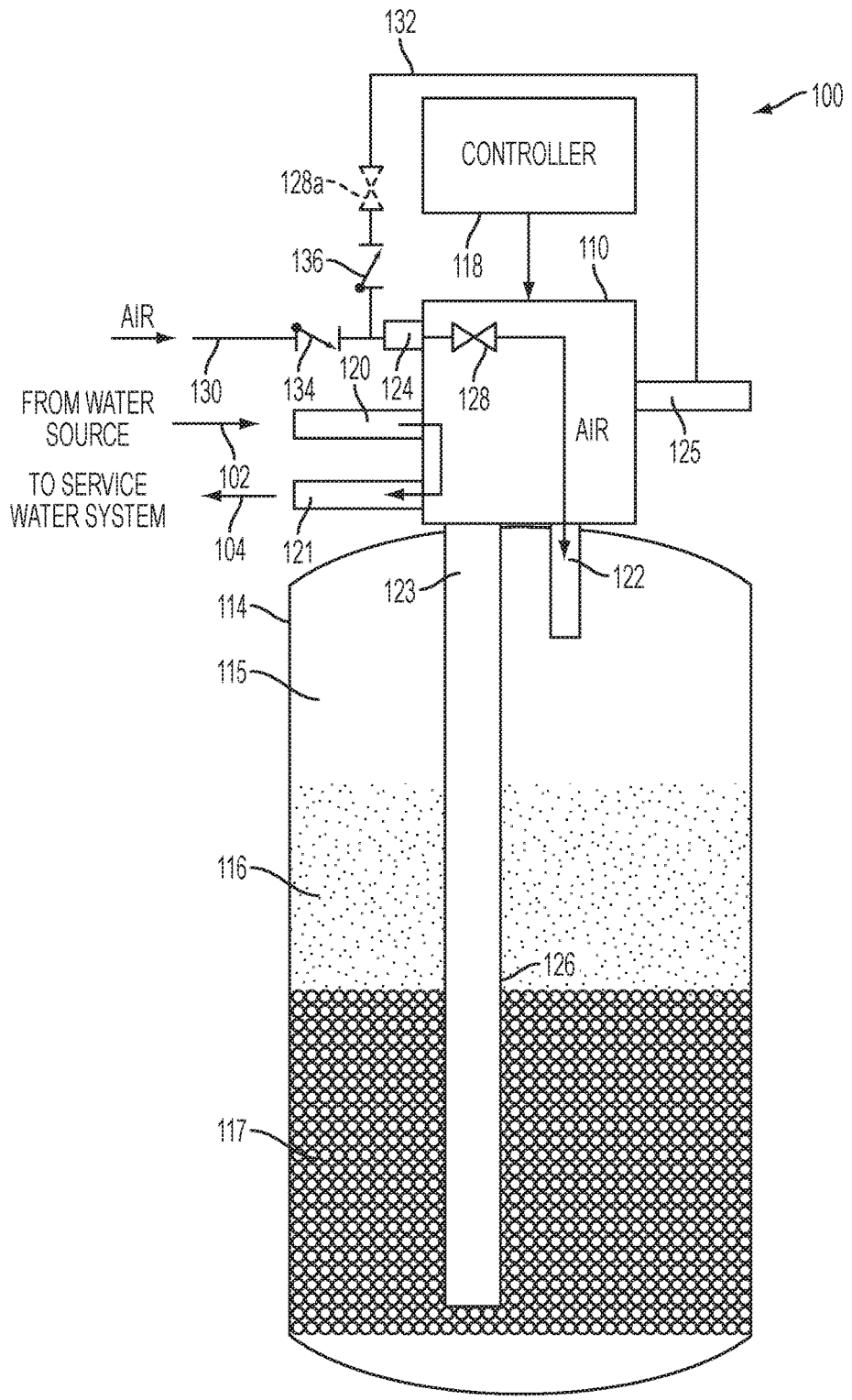
FIG. 2D is a schematic view of the water treatment system in FIG. 1 illustrating flow through the aeration control valve system during an air charge cycle.

FIG. 2D illustrates an air charge cycle during which the water treatment system 100 charges the tank 114 with air. During the air charge cycle in this embodiment, the aeration control valve 110 directs air supplied through the air intake inlet 130 from the air passage 124 to the first tank passage 122. In particular, the air valve 128 may be actuated to allow the air to be supplied into the first tank passage 122. The air may be pumped through the air intake inlet 130 or drawn into the air intake inlet 130 by a venturi. By pumping the air into the water treatment tank 114, the air charge may be accomplished without using water to draw air into the tank and thus without wasting water. During the air charge cycle in this embodiment, the aeration control valve 110 may also direct untreated water from the supply water inlet passage 120 to the service water outlet passage 121 such that water is supplied to the service water system during the air charge cycle. An air release cycle followed by an air charge cycle may be performed periodically and without a backwash cycle, for example, at time intervals corresponding to when the oxidizing capacity of the air charge is consumed.

The operating cycles described above may be performed in different sequences. In one embodiment, the water treatment system 100 perform an air release cycle (e.g., FIG. 2B) followed by an air charge cycle (e.g., FIG. 2D) and may repeat this sequence multiple times without a backwash cycle. In another embodiment, the water treatment system 100 may perform an air release cycle (e.g., FIG. 2B) followed by a backwash cycle (e.g., FIG. 2C) and then an air charge cycle (e.g., FIG. 2D). The controller 118 may be programmed to cause the aeration control valve 110 to perform a certain sequence of operating cycles at desired times. Other sequences and other operating cycles may also be performed by the aeration control valve 110.

Referring to FIGS. 3A and 3B, one embodiment of an aeration control valve 300 is described in detail. The aeration control valve 300 includes a valve body 310 and a controller 318. The valve body 310 is coupled to a tank 314 and defines a supply water inlet passage 320, a service water outlet passage 321, first and second tank passages 322, 323, an air passage 324 and a drain passage 325. According to this embodiment, a valve actuator piston 319 moves within the valve body 310 to provide a fluid connection between the passages 320-325. The aeration control valve 300 is based on a Fleck 5600SXT control valve available from Pentair, Inc., which was originally configured for connection to a brine tank. In this embodiment, the aeration control valve 300 is configured with the air passage 324 being used to supply and release air instead of being connected to a brine tank, eliminating the need for a venturi. When an air pump is used, the air release check valve 336 includes a high tension spring to assure a firm seal such that air is pumped into the air passage 324 but not through the air release check valve 336 to the air release outlet 332.

An air intake inlet 330 is fluidly coupled to the air passage 324, and an air release outlet 332 is fluidly coupled between the air passage 324 and the drain 325. An air intake check valve 334 is coupled to the air intake inlet 330 and an air release check valve 336 is coupled to the air release outlet 332. In this embodiment, an internal air valve 328 controls the release of air to the air passage 324 and the supply of air from the air passage 324. The internal air valve 328 may be the same as the brine safety valve that previously was used to allow brine tank fill and brine draw. This embodiment of the aeration control valve 300 also includes a venturi 329 that draws air in through the air inlet 330 to the air passage 324 when water flows through the venturi 329 (see FIG. 3B). Alternatively, an atmospheric air pump (not shown) may be coupled to the air intake inlet 330 to pump air into the air passage 324.

During an air release cycle, shown in FIG. 3A, the air valve 328 is opened and the valve actuator piston 319 is located at a position that allows air to be released from the tank 314. In this embodiment of the aeration control valve 300, which was originally configured for connection to a brine tank, the air release position of the valve actuator piston 319 is the same as the brine tank fill position.

Releasing air through the venturi 329 provides additional advantages in this embodiment. During an air charge cycle, directing water with iron through the venturi 329 to draw air may cause oxidation of the iron around the venturi 329 and the flow path exiting the venturi 329 into the tank 314. The oxidized iron may build up and clog the venturi and surrounding areas, which may prevent the draw of air, reduces the oxidation that allows non-oxidized iron to pass through the filter bed and clog plumbing and stain clothes and fixtures. The release of air in this embodiment of the aeration control valve 300 causes both air and water to be released through the venturi 329 and into the air passage 324, which results in flushing water and air in a turbulent fashion. This prevents and/or cleans iron build up in the venturi 329 and flow path. During the air release cycle, the aeration control valve 300 may also direct untreated water from the supply water inlet passage 321 to the first tank passage 322 and directs treated water from the second tank passage 323 to the service water outlet passage 321. Thus, the air release may occur while the water treatment system 399 is "in service" and treating water.

During an air charge cycle, as shown in FIG. 3B, the air valve 328 is opened and the valve actuator piston 319 is located at a position that allows air to be supplied from the air intake inlet 330 to the air passage 324 and in to the first tank passage 322 and allows water to flow from the supply water inlet passage 320 to the service water outlet passage 321. In this embodiment of the aeration control valve 300 configured for connection to a brine tank, the air charge position of the valve actuator piston 319 is the same as the brine/slow rinse position.

During a service cycle (not shown), the air valve 328 is closed and the valve actuator piston 319 is located at a position that blocks air from flowing out of the tank 314, allows water to flow from the supply water inlet passage 320 to the first tank passage 322, and allows water to flow from the second tank passage 323 to the service water outlet passage 321. During a backwash cycle (not shown), the air valve 328 is closed and the valve actuator piston 319 is located at a position that allows water to flow from the supply water inlet passage 320 into the service water outlet passage 321 and into the second tank passage 323 and allows water to flow from the first tank passage 322 to the drain passage 325.

Figure 4A:
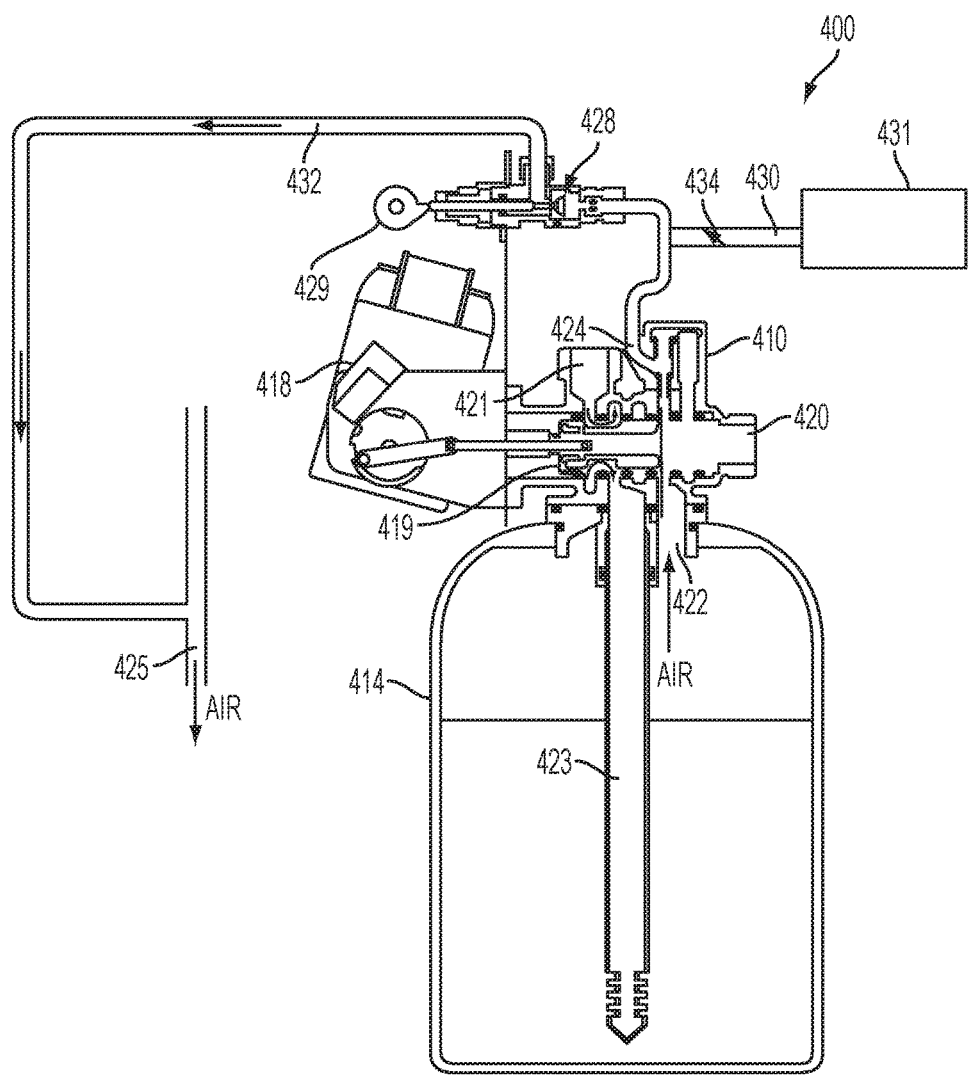
FIGS. 4A and 4B are cross-sectional views of another embodiment of an aeration control valve during an air release cycle and an air charge cycle, respectively.
Figure 4B:
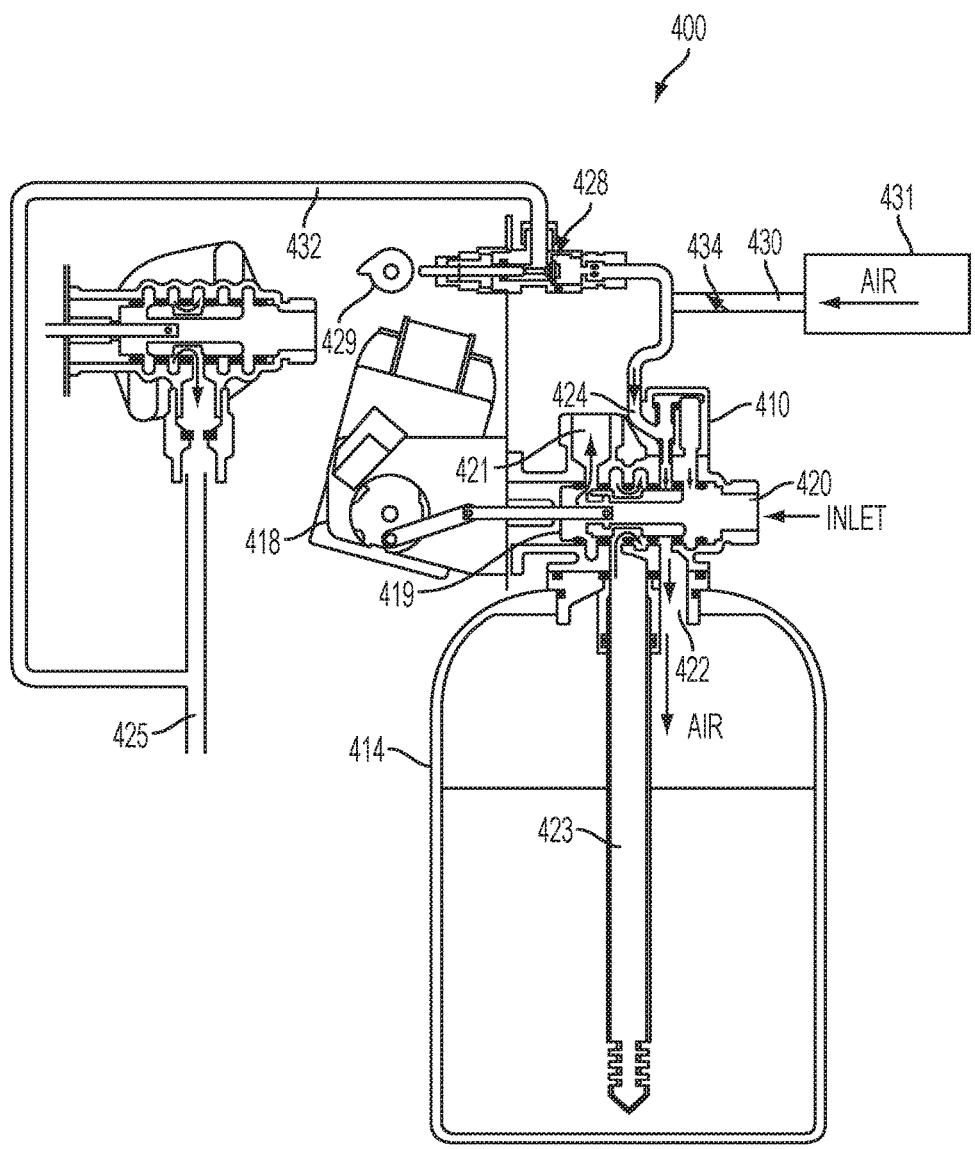

Referring to FIGS. 4A and 4B, another embodiment of an aeration control valve 400 is described in detail. The aeration control valve 400 includes a valve body 410 and a controller 418. The valve body 410 is coupled to a tank 414 and defines a supply water inlet passage 420, a service water outlet passage 421, first and second tank passages 422, 423, an air passage 424 and a drain passage 425. According to this embodiment, a valve actuator piston 419 moves within the valve body 410 to provide a fluid connection between the passages 420-425. The aeration control valve 400 is based on a Fleck 1500 or Fleck 2510 control valve available from Pentair, Inc., which was originally configured for connection to a brine tank. In this embodiment, the aeration control valve 400 is configured with the air passage 424 being used to supply and release air instead of being connected to a brine tank.

An air intake inlet 430 is fluidly coupled to the air passage 424, and an air release outlet 432 is fluidly coupled between the air passage 424 and the drain 425. An air intake check valve 434 is coupled to the air intake inlet 430. In this embodiment, an external air valve 428 in the air release outlet 432 controls the release of air to the air passage 424 and an air check valve is not needed in the air release outlet 432. The external air valve 428, in this embodiment, is in the same location where a brine safety valve would be located and is controlled by a cam 429 that rotates to open and close the valve 428. This embodiment of the aeration control valve 400 also includes an air pump 431 that pumps air in through the air intake inlet 430 to the air passage 424 (see FIG. 4B). Alternatively, a venturi (not shown) may be coupled to the air inlet 430, which draws air in through the air inlet 430 to the air passage 424 when water flows through the venturi.

During an air release cycle, shown in FIG. 4A, the air valve 428 is opened and the valve actuator piston 419 is located at a position that allows air to be released from the tank 414. In this embodiment of the aeration control valve 400, which was originally configured for connection to a brine tank, the air release position of the valve actuator piston 419 is the same as the brine tank fill position. When a venturi is used, releasing the air together with water through the venturi prevents and/or cleans iron build up in the venturi and flow path exiting the venturi, as described above. During the air release cycle, the aeration control valve 400 may also direct untreated water from the supply water inlet passage 420 to the first tank passage 422 and directs treated water from the second tank passage 423 to the service water outlet passage 421. Thus, the air release may occur while the water treatment system 400 is "in service" and treating water.

During an air charge cycle, as shown in FIG. 4B, the air valve 428 is closed and the valve actuator piston 419 is located at a position that allows air to be supplied from the air intake inlet 430 to the air passage 424 and in to the first tank passage 422 and allows water to flow from the supply water inlet passage 420 to the service water outlet passage 421. In this embodiment of the aeration control valve 400 configured for connection to a brine tank, the air charge position of the valve actuator piston 419 is the same as the brine position.

During a service cycle (not shown), the air valve 428 is closed and the valve actuator piston 419 is located at a position that that allows water to flow from the supply water inlet passage 420 to the first tank passage 422, and allows water to flow from the second tank passage 423 to the service water outlet passage 421. During a backwash cycle (not shown), the air valve 428 is closed and the valve actuator piston 419 is located at a position that allows water to flow from the supply water inlet passage 420 into the service water outlet passage 421 and into the second tank passage 423 and allows water to flow from the first tank passage 422 to the drain passage 425.

Figure 5B:
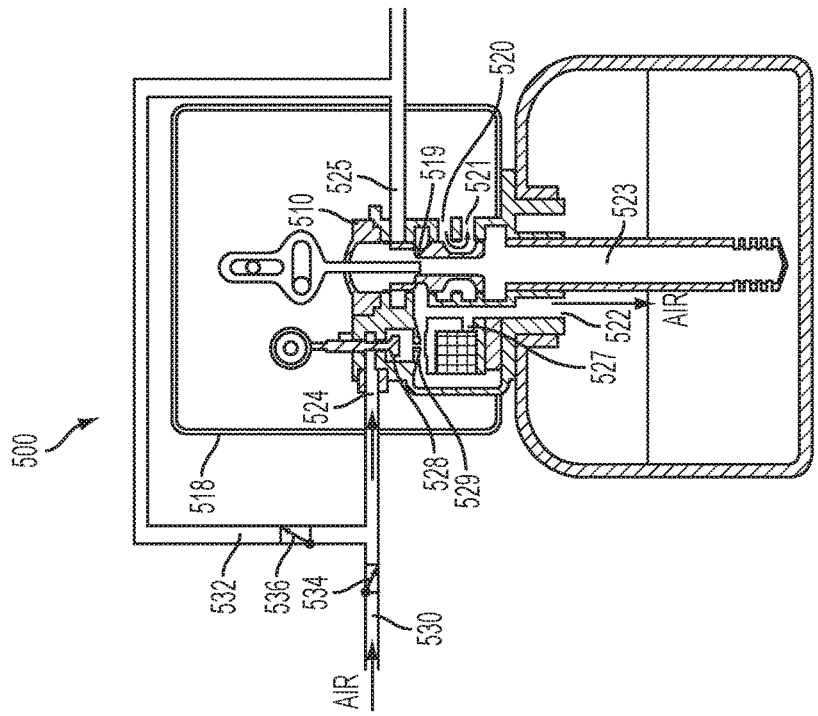
FIGS. 5A and 5B are cross-sectional views of a further embodiment of an aeration control valve during an air release cycle and an air charge cycle, respectively.
Figure 5A:
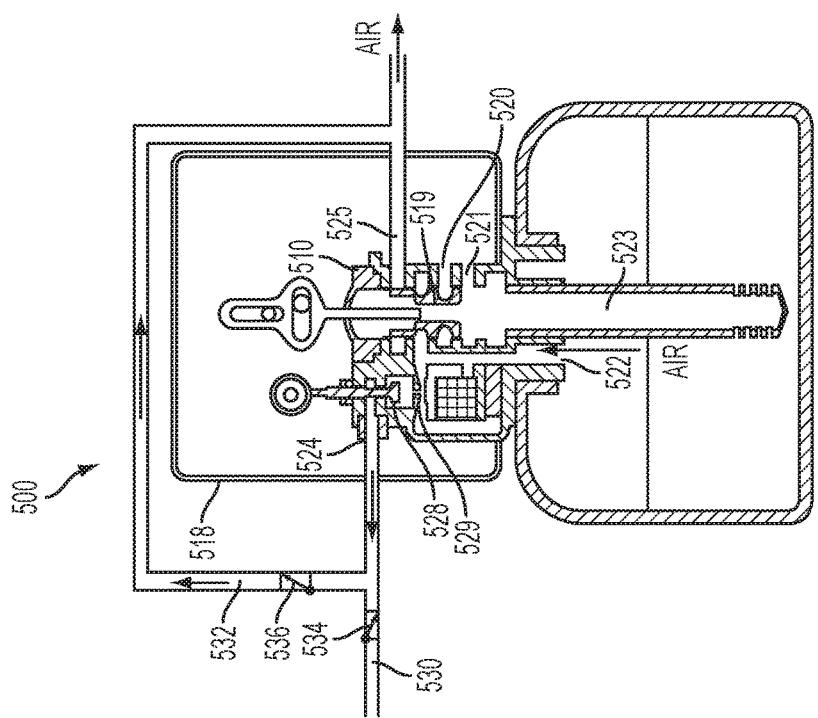

Referring to FIGS. 5A and 5B, one embodiment of an aeration control valve 500 is described in detail. The aeration control valve 500 includes a valve body 510 and a controller 518. The valve body 510 is coupled to a tank 514 and defines a supply water inlet passage 520, a service water outlet passage 521, first and second tank passages 522, 523, an air passage 524 and a drain passage 525. According to this embodiment, a valve actuator piston 519 moves within the valve body 510 to provide a fluid connection between the passages 520-525. The aeration control valve 500 is based on a Fleck ProFlowSXT or Fleck 5800SXT control valve available from Pentair, Inc., which was originally configured for connection to a brine tank. In this embodiment, the aeration control valve 500 is configured with the air passage 524 being used to supply and release air instead of being connected to a brine tank.

An air intake inlet 530 is fluidly coupled to the air passage 524, and an air release outlet 532 is fluidly coupled between the air passage 524 and the drain 525. An air intake check valve 534 is fluidly coupled to the air intake inlet 530 and an air release check valve 536 is fluidly coupled to the air release outlet 532. In this embodiment, an internal air valve 528 controls the release of air to the air passage 524 and the supply of air from the air passage 524. The internal air valve 528 may be the same as the brine safety valve that previously was used to allow brine tank fill and brine draw. This embodiment of the aeration control valve 500 also includes a venturi 529 that draws air in through the air inlet 530 to the air passage 524 when water flows through the venturi 529 (see FIG. 5B). Alternatively, an atmospheric air pump (not shown) may be coupled to the air intake inlet 530 to pump air into the air passage 524. This embodiment of the aeration control valve 500 further includes either a plug or a check valve 527 to prevent air from traveling to the service water outlet 521. When a venturi 529 is used to supply air, a check valve may be used, and when a pump is used (not shown), a plug may be used.

During an air release cycle, shown in FIG. 5A, the air valve 528 is opened and the valve actuator piston 519 is located at a position that allows air to be released from the tank 514. In this embodiment of the aeration control valve 500, which was originally configured for connection to a brine tank, the air release position of the valve actuator piston 519 is the same as the brine tank fill position. Releasing the air together with water through the venturi 529 prevents and/or cleans iron build up in the venturi 529 and flow path exiting the venturi, as described above.

During an air charge cycle, as shown in FIG. 5B, the air valve 528 is opened and the valve actuator piston 519 is located at a position that allows air to be supplied from the air intake inlet 530 to the air passage 524 and in to the first tank passage 522 and allows water to flow from the supply water inlet passage 520 to the service water outlet passage 521. In this embodiment of the aeration control valve 500, which was originally configured for connection to a brine tank, the air charge position of the valve actuator piston 519 is the same as the brine/slow rinse position.

During a service cycle (not shown), the air valve 528 is closed and the valve actuator piston 519 is located at a position that that blocks air from flowing out of the tank 514, allows water to flow from the supply water inlet passage 520 to the first tank passage 522, and allows water to flow from the second tank passage 523 to the service water outlet passage 521. During a backwash cycle (not shown), the air valve 528 is closed and the valve actuator piston 519 is located at a position that allows water to flow from the supply water inlet passage 520 into the service water outlet passage 521 and into the second tank passage 523 and allows water to flow from the first tank passage 522 to the drain passage 525.

Accordingly, an aeration control valve, consistent with the embodiments herein, may facilitate aeration in a water treatment system without requiring a backwash cycle to release an air charge. The aeration control valve also allows an air release to occur while the water treatment system is "in service" and treating water.

Consistent with one embodiment, aeration control valve system is provided for use with a water treatment tank. The aeration control valve system includes a supply water inlet passage configured to receive water from a water supply, a service water outlet passage configured to direct water to a service water system and first and second tank passages configured to direct water in to or out of the water treatment tank, an air passage fluidly coupled to the first tank passage and configured to allow air to pass to and from the first tank passage, and a drain outlet passage configured to direct water from the water treatment tank to a drain. The aeration control valve system also includes an air intake inlet fluidly coupled to the air passage and configured to supply air to the air passage and an air release outlet fluidly coupled between the air passage and the drain outlet passage and configured to release air to the drain outlet passage. A valve cycle actuator is configured to provide fluid connections between the passages based on different positions of the valve cycle actuator during different operation cycles. An air valve configured to allow air to be released from and/or supplied to the water treatment tank. An air intake check valve configured to allow air to be supplied through the air intake passage without allowing air to be released.

Consistent with another embodiment, a method is provided for operating a water treatment system including a control valve unit coupled to a water treatment tank. The control valve unit is configured to be used with a brine tank, and wherein a brine passage in the control valve unit is fluidly coupled to an air intake inlet and an air release outlet instead of a brine tank. The method includes: treating the water in the water treatment system by directing water from a water supply to a water treatment tank, passing the water through an air charge to aerate the water, and directing treated water from the water treatment tank to a service water system; supplying air to the water treatment tank through the air intake inlet and the brine passage when a valve cycle actuator of the valve control unit is in a brine cycle position to provide the air charge; and releasing the air from the water treatment tank through the brine passage and the air release outlet when a valve cycle actuator of the valve control unit is in a brine tank fill cycle position.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method of operating a water treatment system including a control valve unit coupled to a water treatment tank, wherein the control valve unit is configured to be used with a brine tank, and wherein a brine passage in the control valve unit is fluidly coupled to an air intake inlet and an air release outlet instead of a brine tank, the method comprising:
    treating the water in the water treatment system by directing water from a water supply to a water treatment tank, passing the water through an air charge to aerate the water, and directing treated water from the water treatment tank to a service water system;
    supplying air to the water treatment tank through the air intake inlet and the brine passage when a valve cycle actuator of the valve control unit is in a brine cycle position to provide the air charge; and
    releasing the air from the water treatment tank through the brine passage and the air release outlet when a valve cycle actuator of the valve control unit is in a brine tank fill cycle position.

2. The method of claim 1 wherein air is released by actuating a valve.

3. The method of claim 1 further comprising performing a backwash cycle at a later time after performing multiple cycles of releasing air and supplying air.

4. The method of claim 1 wherein the air is supplied by drawing the air into the water treatment tank through a venturi.

5. The method of claim 4 wherein the air is released through the venturi together with water.

6. The method of claim 1 wherein the air is supplied by pumping air into the water treatment tank.

7. The method of claim 1 wherein the air release outlet is external to the valve cycle actuator.

8. The method of claim 1 wherein the air release outlet is fluidly coupled to a drain outlet passage.

9. The method of claim 1 wherein supplying air to the water treatment tank through the air intake inlet and the brine passage includes supplying air through an air intake check valve configured to allow air to be supplied without allowing air to be released.

10. The method of claim 1 further comprising passing the aerated water through filter media in the water treatment tank to filter the aerated water.

* * * * *